Nov. 15, 1938.  G. G. VERNON ET AL  2,136,986
HYDRAULIC TRANSMISSION FOR CONVERTING ROTARY INTO RECIPROCATING MOTION
Filed April 25, 1935  2 Sheets-Sheet 1

Inventors
G. G. Vernon,
A. J. Greenfield
Chas. J. Williamson
By
Attorney

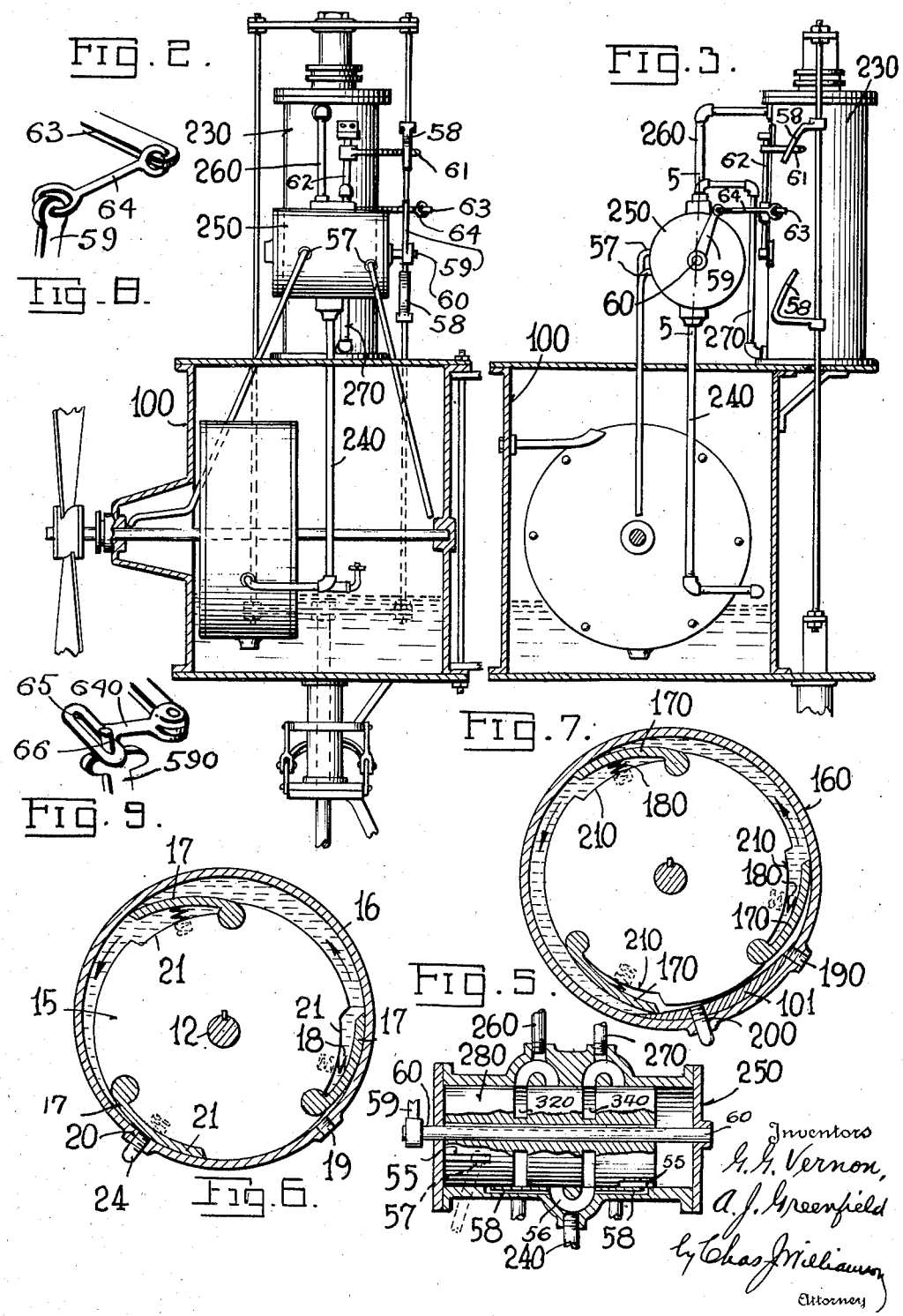

Patented Nov. 15, 1938

2,136,986

UNITED STATES PATENT OFFICE 2,136,986

HYDRAULIC TRANSMISSION FOR CONVERTING ROTARY INTO RECIPROCATING MOTION

General G. Vernon and Andy J. Greenfield, Happy, Tex.

Application April 25, 1935, Serial No. 18,273

6 Claims. (Cl. 60—52)

Our invention concerns apparatus for converting rotary into reciprocating motion and in what we now consider a most satisfactory embodiment of our invention, it is embodied in pumping mechanism or apparatus, the rotary motion to be converted being for example, obtained from a windmill and transmitted to a pump plunger, or piston to reciprocate the latter for pumping water or other liquid. In that embodiment of our invention, the important or desirable objects are secured of constant and steady transmission of power to the reciprocating plunger or piston, freedom from or absence of loose joints that would result in lost motion or undue wear of parts, freedom from side thrust of parts, whereby loss of power and wear of parts are avoided, prevention or avoidance of wear from other causes and thereby giving long life to the working parts of the mechanism and dependability of operation at all times. Other objects and advantages of that embodiment of our invention will be seen from the hereinafter given description of the illustration in the drawings of that embodiment.

But it is to be understood as indeed has already been indicated, that our invention is not to be restricted in its scope only to the particular embodiments thereof shown in the drawings and hereinafter described, but our invention consists in whatever is described by or is included within the terms or scope of the appended claims.

In the accompanying drawings:

Fig. 2 is a similar view of another embodiment thereof;

Fig. 3 is an elevation with parts in section of the embodiment shown in Fig. 2, seen from a position at right angles to that from which Fig. 2 is viewed;

Fig. 5 is a longitudinal axial section of the valve mechanism on the line 5—5 of Fig. 3;

Figs. 6 and 7 are, respectively, detail views in cross-section of different rotary pump constructions we may use.

Fig. 8 is a detail view in perspective showing the link connection between the lever arms of the valve operating mechanism which allow axial movement of the valve;

Fig. 9 is a similar view of another jointed connection for the same purpose.

Figure 1:
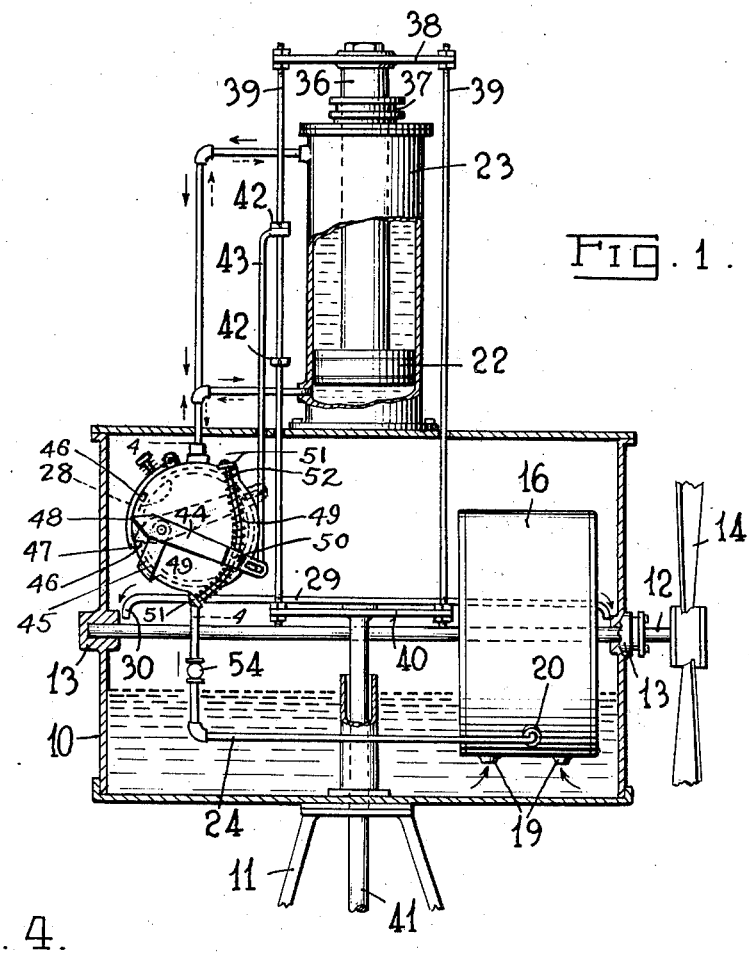
Fig. 1 is a view in side elevation with parts in section of one embodiment of our invention.
Figure 4:
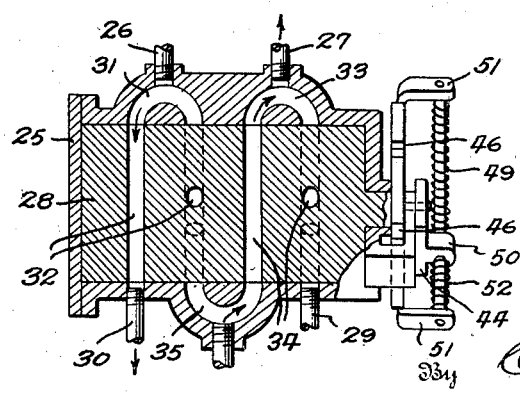
Fig. 4 is a longitudinal axial section on the line 4—4 of Fig. 1 of the rotary valve mechanism thereof.

Briefly described, each embodiment of our invention shown in the drawings comprises a tank for holding liquid such as oil, a rotary pump situated in such tank whose rotor is revolved by the prime mover such as a windmill, a hydraulic cylinder and circulating connections between the rotary pump and the cylinder to opposite sides of the cylinder piston and including an automatically operated valve to change the direction of flow of transmission liquid between the pump and the hydraulic cylinder so as to cause reciprocation of the cylinder piston. The piston is connected to the piston rod of a pump and thus the energy from the prime mover is transmitted to that pump.

Describing in detail what appears in the drawings, and with particular reference to Figs. 1, 2 and 3, there is a liquid holding tank 10, shown mounted on the upper end of a windmill framework 11, through which tank passes a horizontal shaft 12, supported in suitable bearings 13, upon the opposite end walls of the tank. Upon one end of the shaft that projects to the outside of the tank is mounted the windwheel 14, by the revolution of which the shaft 12 is revolved and such windwheel is preferably of the high speed type and may be of any desired construction since in itself it is no part of the present invention.

Keyed to the shaft 12 is the rotor or impeller 15 of a rotary pump or motor having a cylindrical casing or shell 16, between the inner periphery of which and the rotor 15 is a substantially crescent-shaped space that is provided by the eccentric location of rotor axis and casing axis. Pivotally secured at one edge and at diametrically opposite points of the rotor body on the periphery thereof are three or more similar impeller blades or pistons 17, each of which is pressed yieldingly outward by a coil spring 18, in contact with the inner periphery of the shell or casing 16, at all points in the revolution of the rotor, so that the forward free edge of the blade or piston 17, will always contact with the inner periphery of the shell or casing, notwithstanding the eccentricity of the arrangement of rotor and casing. Thus each piston 17 will act in succession to draw into the casing or shell 16 through an induction port or ports 19, oil or other liquid within the tank 10 and will force or press forward through the curvilinear liquid space, liquid in advance of the forwardly moving surface of the piston and finally cause its expulsion from the shell through one or more exhaust ports 20. For each curvilinear piston or blade 17, a recess 21 is provided in the adjacent periphery of the rotor body into which the piston moves or plays, as by the revolution of the rotor, the piston advances through the successively narrowing portions of the crescent space or chamber within the shell or casing 16. The contact of the free edge of a piston blade with the interior surface of the shell 16, makes it serve as a valve to prevent liquid in rear thereof passing beyond each plate and thus assures the suction action of the piston advancing beyond the induction port and assures the outflow of liquid through the exhaust port.

It will be seen that there is a constant or steady and continuous flow of liquid through the rotary pump or motor so that liquid under the desired pressure flows through the eduction port or ports for delivery to the reciprocating plunger or piston 22 of the hydraulic cylinder 23, which as shown, is conveniently mounted on the top of the tank 10, and with which, by suitable pipe and valve connections, circulation of the power-transmitting fluid is accomplished.

The induction port or ports 19 open into the power transmission liquid which is maintained at a suitable level within the tank 10.

From exhaust port or ports 20, a pipe 24 runs to the induction port or ports of a control valve 25, which may be conveniently mounted or placed in the tank 10 and from suitable ports of said valve 25, a pipe 26, runs to the hydraulic cylinder 23, above the piston 22 thereof, and a second similar pipe 27, runs to the hydraulic cylinder below the piston 22, so that according to the position of the valve 25, liquid under pressure from the rotary pump or motor will be delivered either to the underside of the piston 22 to force it upward, or to the upperside of such piston to force it downward.

The valve 25, shown is of the rotary type and within a casing with a cylindrical interior includes a close fitting oscillatory cylinder body 28, which has a set of diametrically extending ports spaced apart axially of the cylinder 28. Such ports are so relatively arranged with reference to the valve ports above mentioned that in one oscillatory position of the cylinder 28, there will be flow from the rotary pump or motor through pipe 24 and pipe 26 to the hydraulic cylinder 23 above the piston 22 thereof, which at that time is at the upper end of the piston to supply liquid under pressure to the upper side of the piston and so as to connect pipe 27 at the bottom of the cylinder 23, with pipe 29, which leads from the valve 25 and opens into the tank 10 preferably adjacent one of the bearings 13 of the shaft 12 to lubricate the latter while at the same time returning liquid to the tank and thus complete circulation between tank and hydraulic cylinder 23. At another point in the oscillatory movement of the ported cylinder 28, the pipe connections will be reversed which occurs when the piston 22 is in its lowest position in cylinder 23, so that fluid under pressure will be delivered from pipe 27 to the under side of the piston 22 to move it upward, and liquid above the piston will be exhausted through pipe 26 and will be discharged from the valve by a pipe 30, that leads therefrom to a point near the other bearing of shaft 12, to lubricate the same and deliver the returning liquid to the tank 10. The arrows in full lines in Fig. 1 show the circulation when the piston is at the lower end of the hydraulic cylinder ready to ascend, and the arrows in dotted lines show the reverse direction of circulation when the piston has reached the upper limit of its travel and is ready to descend.

Pipe 26 has a branched connection 31 with two adjacent ports in the valve casing with which the two cylinder ports 32 alternately connect and the pipe 27 has a branched connection 33 with two adjacent ports in the valve casing with which alternately connect two ports 34 in the cylinder 28. And pipe 24 leading from the rotary pump or motor has a branched connection 35 which opens into the cylinder casing in position to aline with the ports 32 and 34 that are nearer one another.

The rotary valve cylinder 28 is automatically shifted at the proper time to reverse the flow of liquid to and from hydraulic cylinder 23 by an operative connection with the piston 22. As shown in the drawings, such operative connection includes a piston rod 36 which passes upward through a packing box 37 at the upper end of the cylinder 23 and above the top of the cylinder 23 is connected to a frame or yoke that includes a top cross bar 38, a pair of parallel vertical rods 39 that extend downward on the outside of the cylinder 23, and a bottom cross bar 40, which connects said rods a substantial distance below the bottom of the cylinder 23, and to which is connected the piston rod 41 of the well pump that is driven by the windmill.

Upon one of the rods 39, two set collars 42 are placed at spaced distances apart and in position so that one or the other according as the rod moves up or down, will engage and carry along with it as it moves a rod 43, which at its upper end has an eye through which the rod 39 passes, and at its lower end is pivotally connected to an arm or lever 44, pivoted between its ends to an oscillatory disc 45, at one end of the valve 25, and which is rigidly connected to the oscillatory ported cylinder 28 of the valve. In the peripheral edge of the disc 45, are two spaced apart radial notches 46, which alternately are engageable by one end of a spring-held latch 47, and thereby the ported cylinder 28 is releasably held in each of its two positions. The notch-engaging end of the latch is in position to be engaged by one or the other inclined sides of the beveled point or extremity 48 of the lever 44, and disengaged from the notch it happens to engage to free the disc 45 and the ported cylinder 28 for movement which is automatically effected by a spring device. Said spring device includes two oppositely acting coil springs 49 situated on opposite sides of the lever 44 and having at their nearer ends bearing contact on a lug 50, projecting outward from said lever, and each spring at its other or outer end engages a bearing 51, rigidly secured to the edge of the oscillatory disc 45, so that as the lever 44, moves in one direction, it compresses one of said springs until the tip 48 of the lever disengages the latch 47, whereupon the spring 49 thus compressed will be suddenly released and reacting will turn the disc 45 and the valve cylinder 28 to a point where the latch 47 engages with the other notch 46. The springs are curved to readily allow the swinging movement of the lever 48 and to support and guide them, they are placed upon a correspondingly curved rod 52, that extends from one bearing 51 to the other.

Surrounding the portion of the pump rod 42 within the tank 10, is a tube 53, whose top reaches to a point above the level of the oil or other liquid in the tank 10, and thus a packing is rendered unnecessary where the pump rod passes through the bottom of the tank.

In the eduction pipe 24 leading from the rotary pump is a safety valve 54, located in advance of the control valve 25, so that should there be any obstruction to the movement of the moving parts, such as the pump rod 53 because of freezing of water in the pump rod shaft, such safety valve will open during the continued action of the rotary motor and no breakage or other damage to parts of the mechanism will result. The safety valve delivers liquid therefrom back into the tank 10.

It is a feature of our apparatus that the downstroke of the piston 22 and the pump rod is faster than the upstroke. For example, the speed may be twice as great during the down-stroke. This we accomplish by reducing the volume of the space within the hydraulic cylinder 23, which is above the piston 22, over that below and that we do by giving the piston rod 36 a diameter great enough for that purpose, so that in fact, it is to be regarded as a filling cylinder rather than a mere piston rod.

Describing that embodiment of our invention with especial reference to Figs. 2, 3, 5, 6 and 7, it will be found that there are differences in respect of the rotary valve and its operating mechanism, the rotary pump and the casing.

The casing 100, shown in Figs. 2 and 3 is similar to that shown in Fig. 1, in that it contains the rotary pump and has bearings at opposite side walls of the casing for the windmill-driven rotor shaft and the mounting of the hydraulic cylinder upon the top wall of the casing with its longitudinal axis in vertical alinement with the well pump rod which extends from below the bottom wall of the casing upward therethrough and with which the pitman rod connections with the piston of the hydraulic cylinder are made, but these parts are outside of the casing 100. The casing 100, at its bottom rests upon the top of the windmill tower.

The rotor or impeller 150 of the rotary pump shown in Fig. 7 is concentric with the cylindrical casing or shell 160, instead of eccentric and pivoted to its periphery are three equi-distant similar impeller blades or pistons 170, each of which is pressed yieldingly outward by a coil spring 180, into contact with the inner periphery of the shell or casing at all points in the revolution of the rotor and for each is a recess 210 into which the piston moves or plays when its outer edge contacts with the inner surface of a sealing wall 101, which extends between the inlet and exhaust ports 190 and 200, and which adjacent each of such ports inclines outward from the rotor periphery to the inner periphery of the shell or casing to one side of each of such ports. Of course, more than three impeller blades or pistons 170 may be used.

The rotary valve of the embodiment of our invention shown in Figs. 2 and 3, includes a cylindrical shell or casing 250, with the interior of which are connected pipes 260 and 270 that connect with the hydraulic cylinder 230, and a pipe 240 which connects with the rotary pump cylinder, in these respects the construction being similar to that of Fig. 1.

Within and closely fitting such casing peripherally, is an oscillatory cylindrical body 280, which at its central portion has two annular spaces or ports 320 and 340 that extend circumferentially across such body and are so spaced apart that by the axial shifting of said body, the proper liquid flow connections with the pipes 240, 260 and 270, may be made to produce a similar circulation to that hereinbefore described in connection with Fig. 1. For the axial shifting of the cylindrical valve body, it, of course, is shorter than the distance between the opposite ends of the cylindrical shell and we effect such axial shifting to change the pipe connections by fluid pressure applied to the respective ends of the valve body. For that purpose in the periphery of the valve body near each end is a longitudinally extending groove or channel 55, adapted alternately by the oscillation of the valve body to register with one end of a port or passage 56, that is in constant communication with liquid flowing into the valve casing from the delivery pipe 240, of the rotary pump, and with one end of an exhaust port or passage 57, leading from the interior of the casing or shell to the exterior thereof. Thus when the rotary and reciprocatory valve body is in one position of its axial movement, liquid under pressure will be supplied between the end thereof and the adjacent end wall of the cylindrical casing and the valve body thereby axially shifted, such movement being possible, because at the other end there can be an outflow or exhaust of fluid through the exhaust passage or pipe 57.

The limited oscillation of the valve body to change its port connections for its reciprocation may be effected by devices receiving the necessary movement from the reciprocation of the pitman connection with the piston of the hydraulic cylinder. Thus to such pitman may be attached two arms each with a free end 58 of cam-form adapted by suitable operative connections to rock an arm 59, fixed to an end of the shaft 60, which extends from the rotary valve body to the exterior of the cylindrical casing. When the piston approaches the end of its down-stroke, the upper cam arm 58 will engage a radial arm 61, on a vertical rock shaft 62, having a crank 63, connected by a link 64 with the valve arm 59 and turn the rock shaft 62 enough to rotate the valve to the position shown in Fig. 3. When the piston approaches the end of its up-stroke, the lower cam arm 58 will engage and act on the opposite side of the crank arm 61 and turn the rock shaft 62 in the opposite direction. The link 64 has at its opposite ends an eye that forms a loose connection between arms 59 and 63 which allows the axial movement of the valve. This is clearly illustrated in Figs. 2, 3 and 8.

As shown in Fig. 9, the link 640 between crank 630 and valve arm 590 may be in the form of a slot 65 in the link 640 engaged by a projection 66 on the lever 590, the slot extending in the direction of axial movement of the valve.

We have already stated that the scope of our invention is not restricted to the embodiments thereof shown in the drawings. As an indication of some other embodiments, we point out that instead of the frame or yoke that connects the piston 22, with the pump rod, there may be a single rod extending downward from the piston 22, with which the connections for operating the control valve may be made; and another type of control valve than the rotary type may be employed in some embodiments of our invention; and other variations or departures in the particular construction of the mechanism may be made.

This application is a continuation in part of our application No. 749,998, filed October 25, 1934.

What we claim is:

1. Hydraulic apparatus comprising a hydraulic cylinder with a reciprocating piston, a liquid holder on which said cylinder is mounted in a vertical position, said holder forming the sole support for said cylinder, the latter being wholly out of the holder, a rotary pump in said holder having an impeller, a horizontal shaft for the impeller supported by bearings at opposite sides of the holder, liquid circulating pipes between pump, holder and hydraulic cylinder, the pipe connections with the latter being above and below the piston thereof, a control valve with which such pipes connect, fluid exhaust passages leading from said valve and discharging adjacent said bearings, and operative connections between piston and valve to shift the valve to change the direction of liquid flow to and from the cylinder, to alternately move the piston in opposite directions and to permit forcible ejection of the fluid through said exhaust passages alternately against said opposite bearings to lubricate the latter.

2. Hydraulic apparatus comprising a hydraulic cylinder with a reciprocating piston, a liquid holder on which said cylinder is mounted in a vertical position, said holder forming the sole support for said cylinder, the latter being wholly out of the holder, a rotary pump in said holder having an impeller, a horizontal shaft for the impeller supported by bearings at opposite sides of the holder, liquid circulating pipes between pump, holder and hydraulic cylinder, the pipe connections with the latter being above and below the piston thereof, a control valve with which such pipes connect, fluid exhaust passages leading from said valve and discharging adjacent said bearings, operative connections between piston and valve to shift the valve to change the direction of liquid flow to and from the cylinder, and said connections including fluid passages between cylinder and valve interior, to alternately move the piston in opposite directions and to permit forcible ejection of the fluid through said exhaust passages alternately against said opposite bearings to lubricate the latter.

3. Mechanism for converting motion comprising a liquid holder, a rotary liquid impeller within such holder and with an induction port situated to be submerged by liquid within the holder, a rotary prime mover on the exterior of said holder operatively connected with said impeller, a hydraulic cylinder having a piston movable to and fro therein, circulating connections between the impeller and the cylinder that lead to opposite sides of said piston, valve means for reversing the direction of flow of the circulating liquid, an operative connection between such valve means and said piston that shift the valve at opposite ends of the travel of the piston, a tubular guide member extending through the bottom of the holder and terminating above the level of the liquid therein, and means that connect said piston with a reciprocating member, to reciprocate the latter, comprising a vertical element situated directly beneath the piston and reaching into the liquid holder through said tubular guide member and having a connection with the piston that is situated within said holder between said impeller and said valve means, said holder having a top on which said hydraulic cylinder rests.

4. Mechanism for converting motion comprising a liquid holder, a rotary liquid impeller within such holder and with an induction port situated to be submerged by liquid within the holder, a rotary prime mover on the exterior of said holder operatively connected with said impeller, a hydraulic cylinder having a piston movable to and fro therein, circulating connections between the impeller and the cylinder that lead to opposite sides of said piston, valve means for reversing the direction of flow of the circulating liquid, an operative connection between such valve means and said piston that shift the valve at opposite ends of the travel of the piston, and means that connect said piston with a reciprocating member, to reciprocate the latter, the circulation means including a pipe or pipes for forcibly discharging the liquid ejected from the cylinder upon each exhaust stroke of the piston into the tank at a point adjacent a bearing to lubricate the latter.

5. Hydraulic mechanism comprising a liquid holder, a rotary liquid impeller within such holder and with an induction port situated to be submerged by liquid within the holder, a rotary prime mover on the exterior of said holder, a horizontal shaft extending from such prime mover into the holder and having bearings at opposite sides thereof, the rotary liquid impeller being mounted on said shaft and said impeller being situated to one side of the vertical center of the holder, a hydraulic cylinder having a piston movable to and fro therein, a top for the holder on which said cylinder is supported substantially at the vertical center of the holder, a tubular guide member extending through the bottom of the holder and terminating above the level of the liquid therein, a piston rod extending upward through the guide member into the holder, substantially in line with the hydraulic cylinder vertical axis, a connection within the holder between said rod and said piston, liquid circulating piping between the rotary impeller and the hydraulic cylinder above and below the piston thereof, said piping being in part within the holder and in part outside of the same with a vertical portion within the holder, valve means for reversing the direction of flow of the circulating liquid through the piping connected with such vertical portion of the piping, and connections reaching from said valve means to the hydraulic cylinder piston that transmit movement from the piston to reverse the direction of flow of the circulating liquid.

6. Hydraulic mechanism comprising a liquid holder, a rotary liquid impeller within such holder and with an induction port situated to be submerged by liquid within the holder, a rotary prime mover on the exterior of said holder, a horizontal shaft extending from such prime mover into the holder and having bearings at opposite sides thereof, the rotary liquid impeller being mounted on said shaft between such bearings, a hydraulic cylinder having a piston movable to and fro therein, a top for the holder on which said cylinder is supported, a piston rod extending upward through the bottom of the holder substantially in line with the hydraulic cylinder vertical axis, a connection above the holder bottom between said rod and said piston, liquid circulating piping between the rotary impeller and the hydraulic cylinder above and below the piston thereof, said piping being in part within the holder and in part outside of the same, valve means for reversing the direction of flow of the circulating liquid through the piping connected with such vertical portion of the piping, connections reaching from said valve means to the hydraulic cylinder piston that transmit movement from the piston to reverse the direction of flow of the circulating liquid, and said valve having exhaust passages leading from the valve to a point adjacent the horizontal shaft bearings whereby the fluid ejected on the exhaust stroke of the piston is forcibly directed against said bearings.

GENERAL G. VERNON.
ANDY J. GREENFIELD.